(Model.)
P. McAUSLAN.
Funnel.
No. 239,967. Patented April 12, 1881.
FIGURE, 1.  FIGURE, 2.
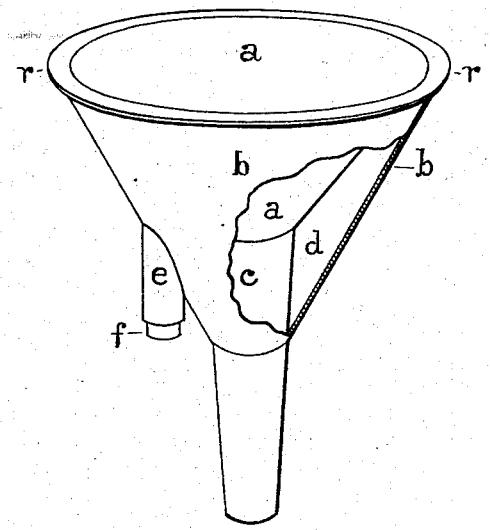
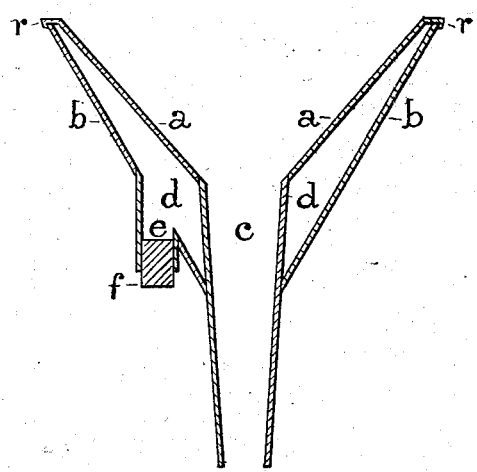
WITNESSES,  INVENTOR,

United States Patent Office.

PETER McAUSLAN, OF HAMDEN, NEW YORK.

FUNNEL.

SPECIFICATION forming part of Letters Patent No. 239,967, dated April 12, 1881.

Application filed December 27, 1880. (Model.)

*To all whom it may concern:*

Be it known that I, PETER McAUSLAN, a citizen of the United States, residing at Hamden, in the county of Delaware and State of New York, have invented a new and useful Improvement in Funnels, which improvement is fully set forth in the following specification, reference being had to the accompanying drawings, in which—

Figure 1 is a perspective view of a funnel embodying my invention, represented with a part of the outside bowl or hollow cone of the funnel broken away on purpose to show the chamber between the inside and outside bowls or hollow cones of the funnel. Fig. 2 is a vertical section of my improved funnel.

Like letters of reference indicate like parts.

Much inconvenience is sometimes experienced in passing molasses, lard-oil, and other liquids which have become partly congealed through funnels as ordinarily constructed.

The object of my invention is to so construct a funnel that partly-congealed liquids may be made to pass through it more rapidly than through an ordinary funnel.

To accomplish this result I construct a bowl or hollow cone of my improved funnel with an inside bowl or hollow cone, $a$, and an outside bowl or hollow cone, $b$, united at the rim $r$, and secured to the pipe $c$ of the funnel in such a manner as to leave or form a hollow space or chamber, $d$, between the inside and outside bowls or hollow cones of the funnel. The use of this chamber $d$ is to hold hot or boiling water, which is introduced into the chamber $d$ through an orifice or tube, $e$, which orifice or tube $e$ may be placed either at the top or bottom of the bowl of the funnel, as may be desired. When placed as shown in the drawings the funnel can be placed with the rim $r$ of the bowl upon the top of a warm stove, thereby keeping the water contained in the chamber $d$ always hot and ready for use. A simple cork or stopper, $f$, inserted in the mouth of the orifice or tube $e$, retains the water in the chamber $d$ when in use.

The method of using my improved funnel is as follows: When it is desired to pass any partly-congealed liquid through the funnel the chamber $d$ is filled with boiling or hot water, and the stopper $f$ inserted in the mouth of the orifice $e$. The funnel is then used in the same manner as any ordinary funnel. The hot water heats the bowl of the funnel, and thereby thaws any partly-congealed liquid in contact with it, thus facilitating the passage of the liquid through the pipe $c$ of the funnel. For liquids that are not partly congealed of course my improved funnel can be used the same as any ordinary funnel.

I do not broadly claim as my invention a funnel as ordinarily constructed with a single hollow cone, $a$, and pipe $c$, such having been long known and in common use. Neither do I broadly claim as my invention the use or employment of heat to thaw partly-congealed liquids, and thereby facilitate the passage thereof through the pipe of a funnel.

What I do claim as my invention, and desire to secure by Letters Patent, is—

1. A funnel provided with a hot-water chamber, the latter having a suitable opening for the supply and discharge of the water, substantially as and for the purposes set forth.

2. As a new article of manufacture, a funnel composed of the hollow cones $a$ and $b$, pipe $c$, hot-water chamber $d$, and supply and discharge opening $e$, substantially as and for the purposes set forth.

PETER McAUSLAN.

Witnesses:
 J. L. PLATNER,
 WM. STEWART.